Dec. 17, 1963  R. COLOMBO  3,114,171
SCREW PRESSES FOR EXTRUDING SYNTHETIC THERMOPLASTIC MATERIALS
Filed Dec. 27, 1961
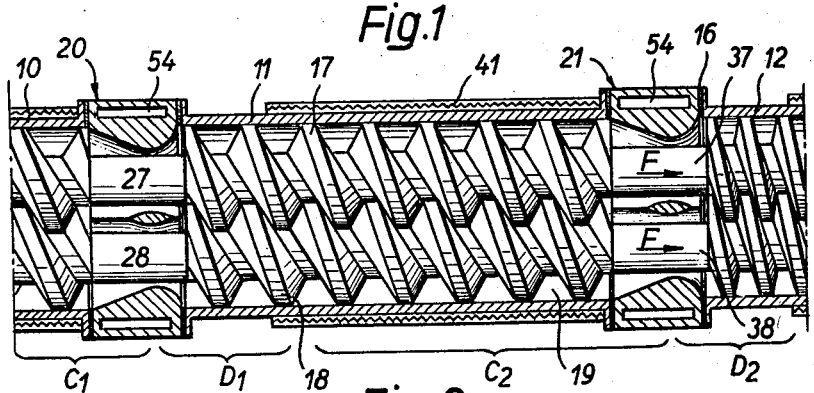
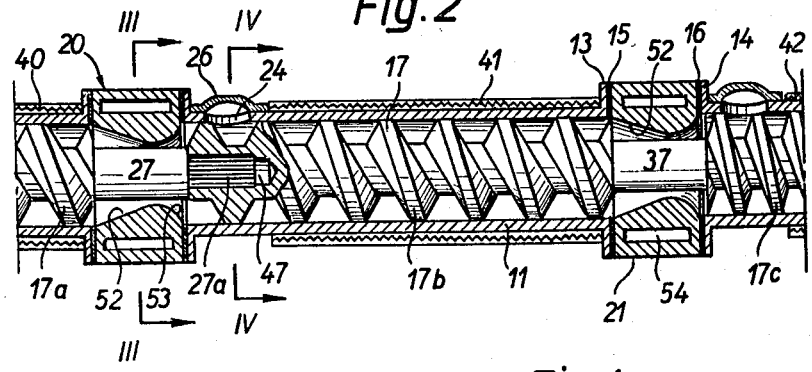
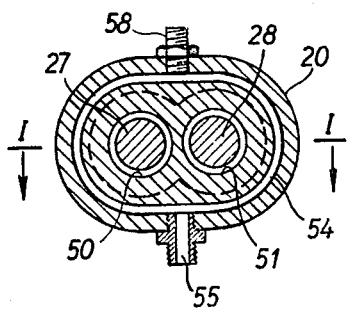
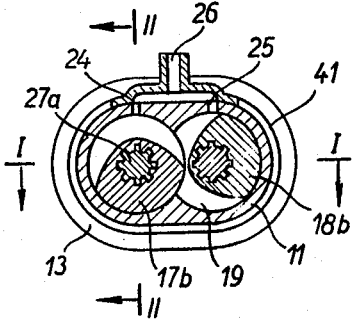

United States Patent Office 3,114,171
Patented Dec. 17, 1963

3,114,171
SCREW PRESSES FOR EXTRUDING SYNTHETIC THERMOPLASTIC MATERIALS
Roberto Colombo, Turin, Italy, assignor to S.A.S. Lavorazione Materie Plastiche (L.M.P.) di M. I. Colombo & C., Turin, Italy
Filed Dec. 27, 1961, Ser. No. 162,347
Claims priority, application Italy Feb. 28, 1961
10 Claims. (Cl. 18—12)

This invention relates to improvements in screw presses for extruding synthetic thermoplastic resins of the multistage compression type, wherein the compression stages are separated by decompression stages, the latter being each provided with a lateral fitting connected with a suction pump in order to draw from inside the press any gases and vapors evolved by the thermoplastic material during its dwelling in the press.

The importance of removing gases and vapors from the material is essential to the standard of the extruded product, particularly in the case of pipes for high-pressure fluids, in which any gas bubble occluded in the pipe wall creates the danger of the pipe bursting under the high pressure of the fluid conveyed thereby.

The results afforded by presses of the type known heretofore are unsatisfactory from many points of view. First of all, the product extruded from such presses still contains gaseous inclusions, though attempts were made to apply to the decompression stages as efficient a suction as possible. Moreover, the material exhibits signs of decomposition (scorching) which means that the material has undergone overheating in one or more of the press regions; by reducing heating of the press or slowing down the rate of extrusion, scorching disappears almost entirely, but the extruded material is not homogeneous and gaseous inclusions increase.

The problem could not be solved heretofore, for it was obvious that removal of gaseous inclusions required extremely high compression of the material at the compression stages, which could not be attained without the danger of scorching. Consequently, as far as manufacture of high-pressure pipes on known presses was concerned, it was necessary to adopt a "safety oversize" for the wall thickness of the pipes with respect to the calculated nominal thickness, which resulted in expense of material and power.

This invention obviates all the above mentioned drawbacks through a combination of features which are in part novel and in part known in the art. The improved press comprises at least one pair of screws having tightly intermeshing screw threads, the screws tightly rotating in their barrel, the screws each including a smooth intermediate section in transverse alignment with the similar intermediate section on the other screw; a throttling member of Venturi profile fast with the barrel and surrounding the said smooth intermediate sections of the two screws; means for heating the barrel and threaded sections of the screws; means for cooling the said throttling member and at least one suction passage in the barrel directly downstream the said throttling member.

According to the most advantageous embodiment of this invention, the taper of the inlet section of the Venturi profile is smaller than the taper of the outlet section, the two sections smoothly merging into each other. The amount of taper of the inlet section is relatively critical in respect of both scorching of the material and sufficient seal against vacuum applied to the suction passtage. Considering two diametrically opposed generatrices of the inlet section, the internal angle between these generatrices should range between about 25° and about 40°. At the same time the ratio of the axial length of the inlet section to the minimum diameter of the Venturi should range between about 1:1 and about 2:1. By way of example, when extruding polyvinyl chloride pipes the above mentioned internal angle amounts preferably to 30° and the above mentioned ratio amounts to about 1.4:1. As will be seen hereafter this invention moreover provides for interchangeability of the throttling member, so that substantially different thermoplastic materials may be processed with the use of the best suited throttling members.

The feature of the smooth nature of the sections of the two screws surrounded by the throttling member is essential from a practical standpoint (standard of the extruded blank). For it was found that, in order to render a highest possible compression of the material (required for a satisfactory seal against vacuum) with the requirement of total absence of overheating, the material should travel through the throttling member at a high spatial speed (volume rate) and under minimum friction against the screws. In the specific case the maximum compression of the material occurs at the inlet section of the Venturi profile; however, through the absence of threads on the screws at this section, instead of being static (stagnation) compression is of a kinetic nature, wherein the material subjected to maximum compression rapidly travels towards the subsequent decompression stage as it is replaced by the incoming material, without any dangerous friction against the screws and throttling member.

The heating means for the barrel and screws is preferably of the electric induction type. To this end the compression stages are surrounded by an induction winding energized from an alternating 500–1000 c./s. current generator, the winding being wound on the barrel and heating both the latter and screws. Alternatively, the barrel and screws could be formed with cavities for circulation of a heating fluid; however, this embodiment would entail excessive technical difficulties in carrying it out. At any rate, it is interesting to note that against common logic the danger of overheating is less with heated than with non-heated screws, more particularly at the first compression stage. Of course, the heating temperature depends upon the nature of the thermoplastic material processed by the press. It was found that this temperature is relatively critical when the two screws are arranged for counter-rotation and therefore requires accurate adjustment; whereas when concurrently rotating screws are employed adjustment of the heating temperature admits much wider allowances. A feature of this invention therefore resides in the provision of concurrently rotating screws.

Further characteristic features and advantages of this invention will be understood from the appended description referring to the accompanying drawing, wherein:

FIG. 1 is a horizontal sectional part view of an extrusion press including two equi-rotating screws, along line I—I of FIGURES 3 and 4;

FIG. 2 is a vertical cross sectional part view through the axis of one screw, substantially on line II—II of FIG. 4;

FIGURES 3 and 4 are cross sectional views on lines III—III and IV—IV, respectively, of FIG. 2.

The press as shown in FIG. 1 is designed for effecting a first compression stage C1, followed by a decompression stage D1, a further compression stage C2, a further decompression stage D2, finally a last compression stage (not shown on the drawing) ending by an extrusion head in a known manner. The first compression stage C1 is fed in a known manner from a hopper not shown.

In construction the above mentioned stages comprise three barrel sections 10, 11, 12 aligned and rigidly connected together through the interposition of throttling members 20, 21. For this purpose the barrel sections are formed with end flanges 13, 14, FIG. 2, clamped against the opposite ends of their respective throttling members 20, 21 by means of bolts (not shown). Flat gaskets 15, 16, respectively, of a heat insulating material are interposed between each throttling member 20, 21 and its adjacent flanges 13, 14.

The barrel sections and throttling members 20, 21 enclose a pair of cylindrical parallel screws 17, 18 each comprising three screw-threaded sections coextensive with their respective barrel sections and two smooth cylindrical sections coextensive with their respective throttling members. The screw-threaded sections on both screws interengage in a substantially material-tight manner and revolve in a material-tight manner in the bore 19 in their respective barrel sections 10, 11, 12, the bore being defined by two parallel cylindrical surfaces intersecting each other and enveloping their respective screws, as is visible in FIG. 4. The two screws are identical with each other and arranged to rotate concurrently, as will be seen from the inclination of their respective threads, and to convey the material in the direction shown by the arrows F, FIG. 1.

The screws each include three aligned parts fast in rotation. Referring to screw 17, FIG. 2, this screw includes parts 17a, 17b and 17c. The part 17a includes a smooth section 27 and ends forwardly by a splined axial pin 27a splined in an axial bore 47 in the rear end of the part 17b. The latter includes in turn a smooth section 37 likewise ending by a splined pin (not shown) similar to the pin 27a, splined in an axial bore in the rear end of the part 17c of the screw. Therefore, when the individual barrel sections 10, 11, and 12 are removed from their respective throttling members 20, 21 such as for interchanging the latter, each screw 17, 18 can likewise be separated into its three parts making withdrawal of the throttling members 20, 21 possible.

The part of the barrel section 11 associated with the first decompression stage D1 has bored therein from the top two suction passages 24, 25 opening into a manifold 26 adapted to be connected with a vacuum pump. Since the region at which the decompression stage D1 is completed and the further decompression stage C2 begins can hardly be accurately foreseen, for the two stages overlap each other by an extent somewhat fluctuating in time in practice, the passages 24, 25 should conveniently be positioned as near as possible to the throttling member 20 preceding them.

Similar suction passages in a similar arrangement are provided in the barrel section 12 ending by the extrusion head.

The three compression stages are heated by induction windings 40, 41, 42 (FIG. 2) arranged on the barrel sections 10, 11, 12, respectively, each winding being arranged to be energized in an adjustable manner with high frequency current, so that each compression stage can be heated to the desired temperature.

The throttling members each comprise a tough steel block, having bored therethrough a pair of passages 50, 51, FIG. 3, concentrical with their respective smooth sections 27, 28 (or 37, 38) on the two screws. The two passages are each of a Venturi profile including an inlet section 52, FIG. 2, and an outlet section 53, which smoothly merge into each other. In the embodiment shown the angle at the apex of the inlet section 52 is about 40°, the ratio of the axial length of the inlet section to the minimum diameter of the Venturi amounting to about 1:1. It will be seen from FIG. 2 that the Venturi profile merges into the internal surface of the barrel section preceding it, so as to avoid stagnation ("dead") regions of the material at its compression stage. The throttling members 20, 21 each have a cooling jacket 54 with fittings 55, 58 for inlet and discharge of the cooling fluid.

In operation a granulated thermoplastic material is charged into the usual hopper associated with the barrel section 10 of the first compression stage, in which the material is heated to a softened condition, mixed and compressed as it travels in the direction of the arrows F. The bilateral heating by both the barrel section 10 and the two screws results in a relatively low gradient of temperature required to bring the material to its softening condition, whereby overheating and scorching of the material is efficiently prevented.

This is further improved by the use of intermeshing equi-rotating screws. For it was found that when employing one screw only the required gradient of temperature is relatively high; a similarly high gradient is necessary when a plurality of independent or only partly intermeshing screws is employed. This invention therefore prescribes as a general rule the provision of two fully intermeshing screws arranged within a common barrel so as to leave to the material a minimum space consistent with the screw diameter, both the screws and barrel being heated. Moreover, as mentioned hereinbefore, the screws are conveniently arranged for operation in the same direction of rotation (equi-rotating screws), which avoids pinching of the material between the screw threads and reduces friction heat and improves the mechanical efficiency of the press.

The material which is softened and mixed in the barrel section 10 undergoes its maximum compression at the inlet section 52 in the first throttling member 20, where it forms a seal. Considering the continuous operation of the press it should be borne in mind that phenomena similar to those described above occur also at the barrel sections 11, 12, that is, at the second and third compression stage, so that a further seal is formed at the second throttling member 21, and a third seal is formed at the extrusion head into which the barrel section 12 connects. At the same time the suction manifold 26 is connected to a vacuum pump. Under these conditions by virtue of the press features described above sealing efficiency at the inlet section 52 of the throttling member 20, 21 safely counteracts a very high vacuum of only a few tenths of millimeters mercury column so that, in practice, the extent to which the material processed in the press is degasified only depends upon the vacuum pump employed, as distinct from prior constructions, in which vacuum obtained at the decompression stages did not even reach 0.6 absolute atmosphere though best vacuum pumps were employed.

As mentioned above the seals are of a fully kinetic character without prolonged stagnation of material at the inlet to the respective throttling members, which avoids the risk of overheating, especially as the throttling members 20, 21 are maintained at a relatively low temperature by circulation of the cooling fluid in jackets 54. Water at room temperature is generally used as a cooling fluid. However, this does not imply that the temperature of the throttling members should be mere room temperature too; on the contrary, their temperature is rather near the softening temperature of the material and the desired temperature is automatically maintained such as by thermoelectric couples (not shown) which control the rate of circulation of the cooling water in the jackets 54. Consequently, the expression "relatively low" referred to above applies as compared with the decomposition (scorching) temperature of the material.

After having travelled through the inlet section 52 of the throttling member the material undergoes a sharp decompression at the outlet section 53; if the vacuum applied to the suction manifolds 26 is high enough, the material goes as far as to "burst" in the decompression sections D1, D2, evolving gas and vapors dissolved therein or included in bubble form. While these gases and vapors are sucked through the passages 24, 25, the material is drawn by the screws and is subjected to the next compression stage, and so on up to extrusion.

A drawback of presently known multi-stage compression and decompression presses resides in the fact that the material at the confluence of the decompression stage with the next compression stage, that is at a transient fluctuating region, tends to reabsorb by a certain extent the just evolved gases and vapors. This drawback could be imaged in the press according to this invention only where an insufficient vacuum pump should be employed; otherwise, the very high sealing effect afforded at the throttling members 20, 21 is largely sufficient to meet such a high vacuum that the fraction of gases and vapors that might have been reabsorbed by the material is quite negligible from a practical standpoint.

It will be understood that the invention can be employed in connection with more than two screws, the screw threads being of constant or variable pitch, the pitch variations being steady or by successive steps (compare the embodiment shown on the drawing), and a number of further modifications and improvements can be made without departing from the scope defined by the appended claims.

What I claim is:

1. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing a Venturi-shaped passage around each of the said transversely aligned smooth sections, means for heating the barrel and threads on the screws, means for cooling said throttling member, and at least one suction passage opening in the barrel directly downstream of the throttling member.

2. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing around each of the said transversely aligned smooth sections a Venturi-shaped passage the inlet section of which has an apex angle between 25° and 40°, means for heating the barrel and threads on the screws, a cooling jacket surrounding the Venturi passage, and at least one suction passage opening in the barrel directly downstream of the throttling member.

3. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing around each of the said transversely aligned smooth sections a Venturi-shaped passage wherein the ratio of the axial length of the inlet section of the passage to the minimum diameter of the latter is between 1:1 and 2:1, means for heating the barrel and threads on the screws, a cooling jacket surrounding the Venturi passage, and at least one suction passage opening in the barrel directly downstream of the throttling member.

4. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing around each of the said transversely aligned smooth sections a Venturi-shaped passage, heat-insulating gaskets interposed between the throttling member and barrel thereby to limit heat transfer between the member and barrel, means for heating the barrel and threaded sections on the screws, a cooling jacket in the throttling member surrounding the Venturi passage, and at least one suction passage opening in the barrel directly downstream of the throttling member.

5. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing around each of the said transversely aligned smooth sections a Venturi-shaped passage the inlet section of which has an apex angle between 25° and 40°, heat-insulating gaskets interposed between the throttling member and barrel thereby to limit heat transfer between the member and barrel, means for heating the barrel and threaded sections on the screws, a cooling jacket in the throttling member surrounding the Venturi passage, and at least one suction passage opening in the barrel directly downstream of the throttling member.

6. An extrusion press for synthetic thermoplastic material comprising in combination: a barrel, a pair of screws with sealingly interengaging threads rotatably arranged in the barrel, each of said screws including a smooth intermediate section transversely aligned with a similar smooth intermediate section on the other screw, a throttling member fast with the barrel providing around each of the said transversely aligned smooth sections a Venturi-shaped passage wherein the ratio of the axial length of the inlet section of the passage to the minimum diameter of the latter is between 1:1 and 2:1, heat-insulating gaskets interposed between the throttling member and barrel thereby to limit heat transfer between the member and barrel, means for heating the barrel and threaded sections on the screws, a cooling jacket in the throttling member surrounding the Venturi passage, and at least one suction passage opening in the barrel directly downstream of the throttling member.

7. An extrusion press for synthetic thermoplastic material comprising in combination: a barrel, a pair of screws with sealingly interengaging threads rotatably arranged in the barrel, each of the screws including a smooth intermediate section transversely aligned with a similar smooth intermediate section on the other screw, a throttling member fast with the barrel providing around each of the said transversely aligned smooth sections a Venturi-shaped passage the barrel comprising a pair of longitudinally aligned sections rigidly connected together by the throttling member interposed therebetween, each of the screws comprising a pair of longitudinally aligned sections mutually coupled for rotation in a region directly downstream the Venturi passage, means for heating the barrel and threads on the screws, a cooling jacket in the throttling member surrounding the Venturi passage, and at least one suction passage opening in the barrel directly downstream of the throttling member.

8. An extrusion press for synthetic thermoplastic material comprising in combination: a barrel, a pair of screws with sealingly interengaging threads rotatably arranged in the barrel, end of the screws including a smooth intermediate section transversely aligned with a similar smooth intermediate section on the other screw, a throttling member fast with the barrel providing around each of the said transversely aligned smooth sections a Venturi-shaped passage the barrel comprising a pair of longitudinally aligned sections rigidly connected together by the throttling member interposed therebetween, each of the screws comprising a pair of longitudinally aligned sections mutually coupled for rotation in a region directly downstream the Venturi passage, the inlet section of the Venturi passage having an apex angle between 25° and 40°, means for heating the barrel and threads on the screws, a cooling jacket in the throttling member surrounding the Venturi passage, and at least one suction passage opening in the barrel directly downstream of the throttling member.

9. An extrusion press for synthetic thermoplastic material comprising in combination: a barrel, a pair of screws with sealingly interengaging threads rotatably arranged in the barrel, each of the screws including a smooth intermediate section transversely aligned with a similar smooth intermediate section on the other screw, a throttling member fast with the barrel providing around each of the said transversely aligned smooth sections a Venturi-shaped passage wherein the ratio of the axial length of the inlet section of the Venturi passage to the minimum diameter of the passage is between 1:1 and 2:1, the barrel comprising a pair of longitudinally aligned sections rigidly connected together by the throttling member interposed therebetween, each of the screws comprising a pair of longitudinally aligned sections mutually coupled for rotation in a region directly downstream the Venturi passage, means for heating the barrel and threads on the screws, a cooling jacket in the throttling member surrounding the Venturi passage, and at least one suction passage opening in the barrel directly downstream of the throttling member.

10. An extrusion press for synthetic thermoplastic material comprising in combination: a barrel, a pair of screws with sealingly interengaging threads rotatably arranged in the barrel, each of the screws including a smooth intermediate section transversely aligned with a similar smooth intermediate section on the other screw, a throttling member fast with the barrel providing around each of the said transversely aligned smooth sections a Venturi-shaped passage the barrel comprising a pair of longitudinally aligned sections rigidly connected together by the throttling member interposed therebetween, each of the screws comprising a pair of longitudinally aligned sections mutually coupled for rotation in a region directly downstream the Venturi passage, heat-insulating gaskets interposed between the throttling member and the barrel sections adjacent thereto to thereby limit heat transfer between the barrel sections and throttling member, means for heating the barrel and threads on the screws, a cooling jacket in the throttling member surrounding the Venturi passage, and at least one suction passage opening in the barrel directly downstream of the throttling member.

References Cited in the file of this patent

UNITED STATES PATENTS

| | | |
|---|---|---|
| 1,156,096 | Price | Oct. 12, 1915 |
| 2,615,199 | Fuller | Oct. 28, 1952 |
| 2,817,876 | Galdelli et al. | Dec. 31, 1957 |

FOREIGN PATENTS

| | | |
|---|---|---|
| 581,927 | Canada | Aug. 25, 1959 |
| 864,916 | Great Britain | Apr. 12, 1961 |